(12) United States Patent
Kidwell et al.

(10) Patent No.: US 8,333,582 B2
(45) Date of Patent: Dec. 18, 2012

(54) APPARATUS AND METHOD FOR EDGE SEALING OF FOAM BOARDS

(75) Inventors: Alexander James Kidwell, Clarks Summit, PA (US); Stephen Idziur, Orchard Park, NY (US); Thomas Zimmermann, Rochester, NY (US)

(73) Assignee: AZEK Building Products, Inc., Scranton, PA (US)

( * ) Notice: Subject to any disclaimer, the term of this patent is extended or adjusted under 35 U.S.C. 154(b) by 126 days.

(21) Appl. No.: 12/390,037

(22) Filed: Feb. 20, 2009

(65) Prior Publication Data

US 2010/0213633 A1    Aug. 26, 2010

(51) Int. Cl.
*B28B 3/12*    (2006.01)

(52) U.S. Cl. ........ 425/335; 425/367; 425/385; 425/384; 425/112; 425/115; 425/343; 264/210.1; 264/211.12; 264/293

(58) Field of Classification Search .......... 425/335, 425/367, 385, 384, 112, 115, 343
See application file for complete search history.

(56) References Cited

U.S. PATENT DOCUMENTS

| | | | |
|---|---|---|---|
| 3,213,510 A * | 10/1965 | Mizer et al. .................... 425/335 |
| 3,331,900 A | 7/1967 | Thomas | |
| 3,476,058 A * | 11/1969 | Henry et al. .................... 72/11.8 |
| 3,608,145 A | 9/1971 | Baker et al. | |
| 3,679,790 A * | 7/1972 | Alfsen .......................... 264/280 |
| 3,764,642 A | 10/1973 | Boutillier | |
| 3,790,436 A | 2/1974 | Graham, Jr. et al. | |
| 3,922,328 A | 11/1975 | Johnson | |
| 4,197,078 A * | 4/1980 | Blomquist et al. ............. 425/385 |
| 4,518,550 A * | 5/1985 | Miettinen et al. ............. 264/46.5 |
| 4,600,637 A * | 7/1986 | Kafka et al. ................... 428/318.4 |
| 4,865,675 A * | 9/1989 | Yamamoto et al. ........... 156/164 |
| 5,240,751 A | 8/1993 | Cakmakci | |
| 5,254,301 A * | 10/1993 | Sessions et al. .............. 264/46.2 |
| 5,508,103 A | 4/1996 | Cope | |
| 5,614,237 A * | 3/1997 | Clow et al. .................... 426/144 |
| 5,681,652 A | 10/1997 | Cope | |
| 5,695,698 A * | 12/1997 | Ajji et al. ....................... 264/40.1 |
| 5,798,064 A * | 8/1998 | Peterson ....................... 264/46.3 |
| 6,026,884 A * | 2/2000 | Spitko .......................... 156/555 |
| 6,331,105 B1 * | 12/2001 | Lee ............................. 425/324.1 |
| 6,368,540 B1 * | 4/2002 | Morales ........................ 264/320 |
| 6,484,776 B1 * | 11/2002 | Meilunas et al. ............. 156/382 |
| 6,520,759 B2 * | 2/2003 | Kitayama et al. ............. 425/4 C |
| 6,682,680 B2 * | 1/2004 | Peterman ..................... 264/259 |

(Continued)

*Primary Examiner* — Christina Johnson
*Assistant Examiner* — Saeed Huda
(74) *Attorney, Agent, or Firm* — Buchanan Ingersoll & Rooney PC

(57) ABSTRACT

A method and machine for sealing at least one cut edge of a foam board is disclosed. The foam board has a top surface, a bottom surface and at least one cut edge extending between the top surface and the bottom surface. The cut edge is passed over a heated roller to soften the edge and then passed over a second roller having a temperature that is lower than the temperature of the first roller which seals the edge. The cut edge may be milled to square the edge relative to the top and bottom of the board before the cut edge is passed over the heated roller. Additional pairs of rollers may be provided to seal the top surface and the bottom surface of the foam board.

13 Claims, 4 Drawing Sheets

U.S. PATENT DOCUMENTS

| | | |
|---|---|---|
| 6,929,459 B2 * | 8/2005 | Kim et al. .................... 425/4 C |
| 7,037,453 B2 * | 5/2006 | Ament et al. .................... 264/42 |
| 8,092,205 B2 * | 1/2012 | Witlin et al. .................... 425/73 |
| 2002/0048614 A1 * | 4/2002 | Kitayama et al. ............. 425/4 C |
| 2004/0036198 A1 * | 2/2004 | Latham ........................ 264/324 |
| 2004/0159977 A1 * | 8/2004 | Perfetto et al. ................ 264/293 |
| 2004/0188874 A1 * | 9/2004 | Hikita et al. ................. 264/1.34 |
| 2005/0253295 A1 * | 11/2005 | Song et al. ............... 264/177.11 |
| 2007/0052129 A1 | 3/2007 | Meredith et al. |
| 2011/0236519 A1 * | 9/2011 | Skertchly ..................... 425/335 |

\* cited by examiner

APPARATUS AND METHOD FOR EDGE SEALING OF FOAM BOARDS

FIELD OF INVENTION

The present invention relates to devices and methods for sealing cut edges of foam boards.

BACKGROUND OF THE INVENTION

Boards made of polyvinyl chloride foam, polyurethane and other plastic foams are often used for decking and non-load bearing exterior trim applications such as beadboard, porch ceilings, door trim, window trim, or fascia and are also used in numerous other trim applications. Such foam trim board products typically have the look and function of premium lumber. Foam trim boards can be cut and shaped using regular woodworking tools.

Foam boards are often cut from large sheets of foam material. The formed sheets have a smooth outer surface, or skin. However, when the sheets of foam are cut to form foam boards, the cut edges of each board do not have a smooth surface but have a cellular structure. The cut edges of the boards are noticeably different from the faces of the boards and pick-up dirt more readily. If the cells are quite small and the board is painted, the differences between the cut edges and the faces are less noticeable. However, builders often prefer to use foam trim boards in applications where the boards were not painted. Consequently, there is a need for a foam board which can be cut from foam sheets and have smooth edges.

U.S. Pat. No. 5,240,751 discloses a decorative plastic trim strip used in automobiles. The strips are made of thermoplastic material. The cut ends of the strips are reshaped by a heated mold that is pressed against the end portion of the trim strip to create a smooth end. However, the use of such a mold slows the manufacturing process by requiring each cut board to be pressed within a mold after cutting of the boards. Moreover, the mold reshapes the cut edges of a product to have a curved end or tapered end. While molds may be useful for creating a smooth end on the end of a strip that is a few inches in width, it is not practical to use a mold to seal an edge that is six to twelve feet in length.

Further, such molding of the ends of trim pieces often creates flashing, which is plastic that extends from the edges of a trim piece after the piece has been formed. Such flashing detracts from the aesthetic effect of the trim piece and may also create installation problems. Hence, the flashing typically must be removed from a piece of trim prior to selling or using the trim piece.

A device and method are needed that can provide a skin or seal to the cut edges of foam boards. The sealed edge must be evenly sealed so that the sealed edge has little to no ability to trap dirt, unlike a non-sealed edge which has an overwhelming ability or tendency to trap dirt. The device and method preferably seal the cut edges to provide an edge having the same look and feel as the surface of the uncut portions of a foam board so each foam board has a consistent appearance. The device and method also preferably reduce, if not eliminate, the formation of flashing that may occur in sealing the cut edges of a foam board.

SUMMARY OF THE INVENTION

We provide a method and machine for sealing the cut longitudinal edges of a foam board in which the board is passed between a pair of heated rollers and then between a second pair of rollers which are at a lower temperature. The rollers in each pair of rollers are spaced apart from one another at a distance which is slightly less than the width of the board such that pressure is applied to the board as it passes between the rollers.

Each heated roller preferably has a temperature of 300° F. to 495° F. and the board preferably moves over the rollers at a speed of 60 ft/min to 120/ft/min. Preferably, the temperature of the second roller device is 120° F. to 160° F.

Embodiments of our method may also including milling the cut edges such that each edge is perpendicular to the top surface and perpendicular to the bottom surface of the foam board prior to passing the board between the heated rollers.

Embodiments of our machine may also include a spacing mechanism attached to at least one of the rollers in each pair of rollers. The spacing mechanism is configured to change the spacing between the rollers in each pair of rollers. It should be appreciated that such changes in spacing can permit the machine to seal edges of boards that have different widths.

A controller may be included in the machine. The controller may be connected to the heating elements and motors or other components of the machine that control the temperature or rotational speed of the rollers or control other machine functions.

Other details, objects, and advantages of the invention will become apparent as the following description of certain present preferred embodiments thereof proceeds.

BRIEF DESCRIPTION OF THE DRAWINGS

In the accompanying drawings we have shown certain present preferred embodiments of our machine for sealing cut edges of a foam board and method of sealing cut edges of a foam board in which.

DETAILED DESCRIPTION OF PRESENT PREFERRED EMBODIMENTS

Figure 1:
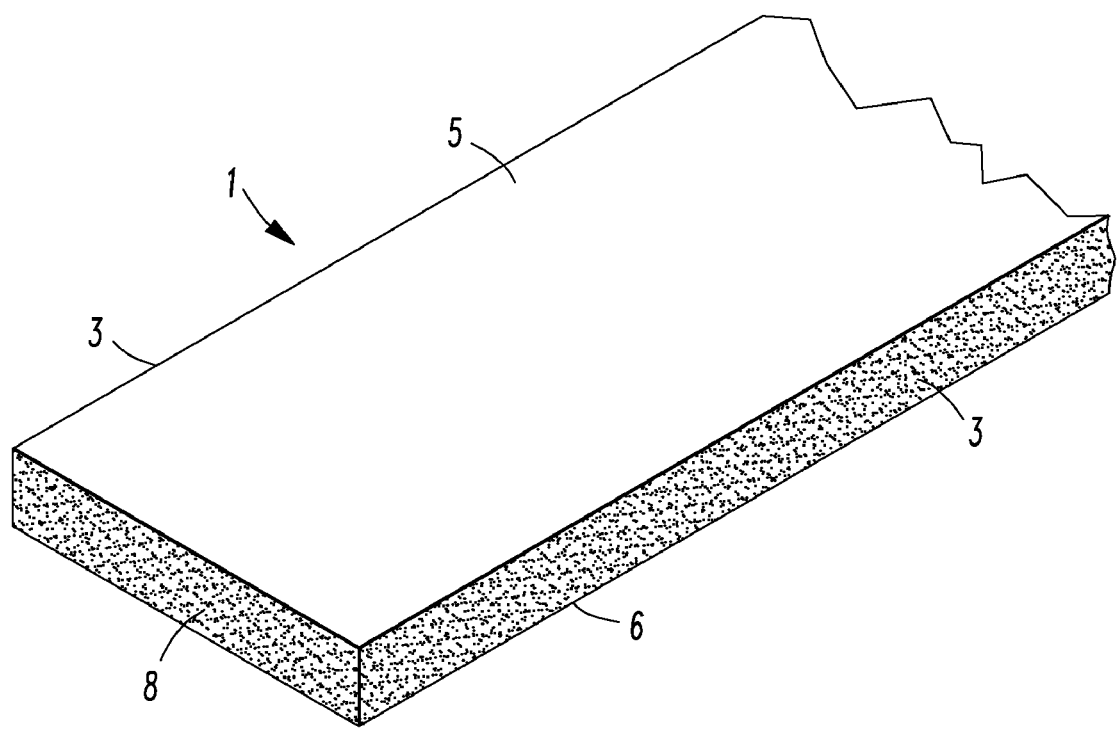
FIG. 1 is a perspective view of a portion of a foam board that has cut edges prior to the cut edges being sealed.
Figure 6:
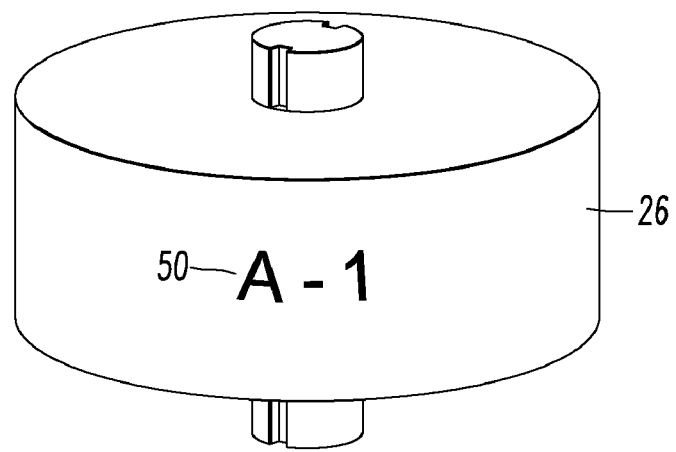
FIG. 6 is a perspective view of a roller that may be used in our machine.

A first present preferred foam board 1 is shown in FIG. 1. The board 1 is cut from a sheet of foam material to form the foam board. The foam board has a top surface 5, a bottom surface 6 and two cut longitudinal edges 3 and two cut ends 8. The top and bottom surfaces have a skin which is formed during manufacture of the foam sheet. The ends 8 and cut longitudinal edges 3 have a rough surface resulting from cells having been cut when the boards were cut from the foam sheet. Depending upon the material used and the method for making the foam, the cells may be similar in size or the cell diameters may vary. Foam made by the Cekula process tends to have cells that vary in size. Foam made using a free foam process tends to have a more uniform cell size. The size of the cells and variation of cell size will determine how rough the cut edges appear to be to the casual observer.

We provide a method and machine 21 shown in FIGS. 3 through 6 for sealing the cut longitudinal edges of a foam board. The machine 21 includes a milling device 22, an optimal belt feeder 25, a first pair of rollers 26 and a second pair of rollers 30 all of which may be on a single frame 15. The machine also includes a guide mechanism 34 between the first and second pairs of rollers 26, 30. The guide mechanism 34 may include guide rollers 35 or a moveable elongated member such as a conveyer belt (not shown).

When foam boards are cut from foam sheet, the cut edges of the foam board may be concave or sloped rather than straight because the foam may have been warm or the blade was at an angle when the board was cut. Uneven edges may also be the result of wear on the cutting blade. If the cut edge is not square relative to the board faces, the edge will be more difficult to seal. Therefore, we prefer to provide a milling device 22 positioned to engage the cut edges of a foam board prior to the foam board passing between the first pair of rollers 26. This device will correct any edges that are not straight and square. The milling device 22 includes blade assemblies or grinding assemblies 23 that cut or grind the cut edges of a foam board so those cut edges are straight. The blade assemblies 23 may include one or more rotary blades, a shearing mechanism, grinder, abrasive roller or other cutting or grinding mechanism. The milling device 22 cuts or grinds foam boards so that the cut edges of the boards are perpendicular to the top and bottom surfaces of the board and straight along their length. Typically only a small amount of material will be removed from the cut edges to make them straight and square.

An optimal feeder 25 may be provided to feed foam boards into the pair of rollers 26 such that the cut edges of the foam board are oriented to engage the rollers. The feeder may also be positioned before the milling device 22 or between the guide mechanism 34 and the second pair of rollers 30 to help ensure the foam boards are properly aligned when passing along the milling device 22 and over the rollers 26, 30.

The first pair of rollers 26 are spaced apart from one another at a distance which is slightly less than the width of the board passing between them. Each roller 26 has a drive mechanism 40, such as a motor. The drive mechanism 40 rotates the roller 26. The spacing between each pair of rollers may be adjusted to engage boards of different widths. The first pair of rollers 26 is heated so that when the cut edges of a foam board pass along the rollers, the heat and pressure applied by the rollers soften or preheat the edge to be sealed. Sealing occurs when the softened edge passes over the second set of rollers 30. The rollers 26, 30 should rotate at a speed sufficient to form a seal on the cut edges of the foam board. Material is not removed from the board by the rollers. The width of the foam board is not changed significantly by the rollers, even though the rollers apply pressure to the cut edges.

Heat and pressure applied by the rollers and the speed of the board passing over the rollers must be controlled to ensure that the cut edges of foam boards are adequately sealed. It was found that if the speed and temperature are not within a narrow range a smooth edge will not be formed, or plastic may stick to and build up on the rollers or flashing may form on the corners of the board between the top and bottom faces and the edge being sealed. If the temperature and speed of the rollers of the first roller device are not hot enough or not fast enough, the cut edges also may not be adequately sealed. Furthermore, the speed and temperature combination must be such that all portions of the edge are sealed regardless of the diameter of the cells. Therefore, the process must work for boards made by the free foam method as well as boards made using the Celuka process.

In view of the operating issues that can prevent an adequate seal from being formed on the cut edges of a foam board, testing was conducted on a prototype machine built by Paratus Industries. Foam boards were run at different combinations of roller speed and roller temperature of the first pair of rollers to identify speed and temperature values that provide acceptable sealed edges. After each board was run through the prototype machine, the cut edge was inspected to determine if the quality of the seal on the cut edge was acceptable. The seal was considered to be acceptable if a pencil mark made on the edge could be easily rubbed off. We were also concerned that the machine operated at a speed that could keep up with board production. The chart below provides the results of this testing:

| Roller Speed For Rollers Of First Roller Device (ft/min) | Roller Temperature (Degrees F.) | Seal Quality Acceptability |
| --- | --- | --- |
| 60 | 300 | Yes |
| 80 | 300 | No |
| 100 | 300 | No |
| 60 | 400 | No |
| 80 | 400 | Yes |
| 100 | 400 | No |
| 60-80 | 425 | Yes |
| 60-80 | 450 | Yes |
| 90-120 | 475-495 | Yes |
| 60 | 500 | No |
| 80 | 500 | No |
| 100 | 500 | No |

Based on the experimentation that was conducted, it was determined that the most preferred roller speed for the rollers is 90 to 120 ft/min with the first pair of rollers at a temperature of 475-495° F. However, roller speeds ranging from 60 to 120 ft/min were acceptable based on different roller temperatures. The higher speeds are preferred because more boards can be sealed during a production period. Furthermore, at 60 ft/min acceptable seals were obtained at 300° F. and 425° F. but not at 400° F. or 500° F. suggesting that a speed of 60 ft/min should not be used. Problems encountered which created unacceptable seal quality were flashing, inadequate sealing and accumulation of plastic material on the rollers. We have found that the time and temperature combinations can be used on foam boards having cell sizes ranging from 0.15 mm to 0.26 mm. Furthermore, one can use these combinations for foams made by the free foam process or the Cekula process.

A spacing mechanism 42 may be attached to the pair of rollers 26. The spacing mechanism includes pistons 44 to adjust the position of at least one of the rollers. One could use other devices such as a chain drive or belt drive in the spacing mechanism.

The guide mechanism 34 is positioned between the first roller device 26 and the second roller device 30 to guide the foam boards from the first roller device 26 to the second roller device 30. The guide rollers 35 may be nip rollers or other rollers that are configured to freely rotate or be driven at a rotational speed to help move foam boards passing along the guide mechanism.

The second pair of rollers 30 are aligned with the first pair of rollers 26. The second pair of rollers 30 may be at room temperature or may be heated to a temperature that is lower than the temperature of rollers of the first roller device 26 to help cure the seal formed on the cut edges by the rollers of the first roller device. Preferably, the rollers in the second pair of rollers 30 are heated to 120° F. to 160° F. The rollers in the second pair of rollers 30 may rotate at the same speed as the rollers 26 of the first pair of rollers or may rotate faster than the rollers of the first pair of rollers.

We have concluded from our testing that the primary function of the first set of rollers is to soften or pre-heat the polymer along the edge that is to be sealed. The first set of rollers does not actually close any cells, it is the second set of rollers that actually does the sealing work. As an example of this, we have run boards through the sealing machine and purposely prevented the second set of rollers from engaging. That resulted in a very rough and totally non-sealed edge.

The function of the second set of rollers is to press or squash the cells closed. The polymer has been raised above it's glass transition temperature by the first set of rollers and is then moved into place and its plastic is memory re-set by the second set of rollers. The temperature of this second set of rollers is also far more important and narrow-ranged than the first set. If the temperature is too high the second set of rollers is not able to reset the plastic memory and the polymer will return to its pre-sealed rough state. Accordingly, the second set of rollers performs two functions, moving soft and mobile polymer into a smooth state and resetting or freezing memory.

Figure 2:
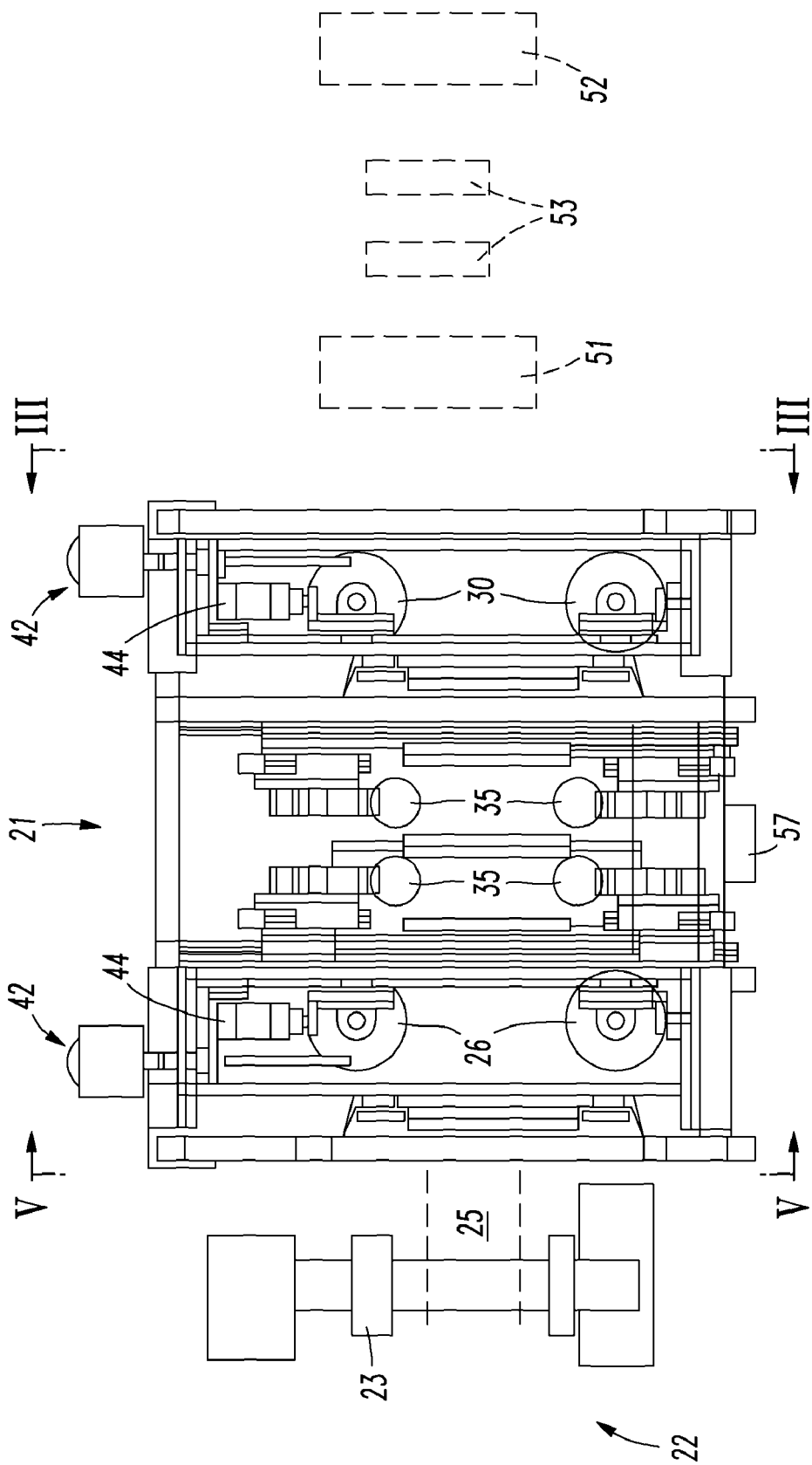
FIG. 2 is a top view of the first present preferred embodiment of our machine.
Figure 3:
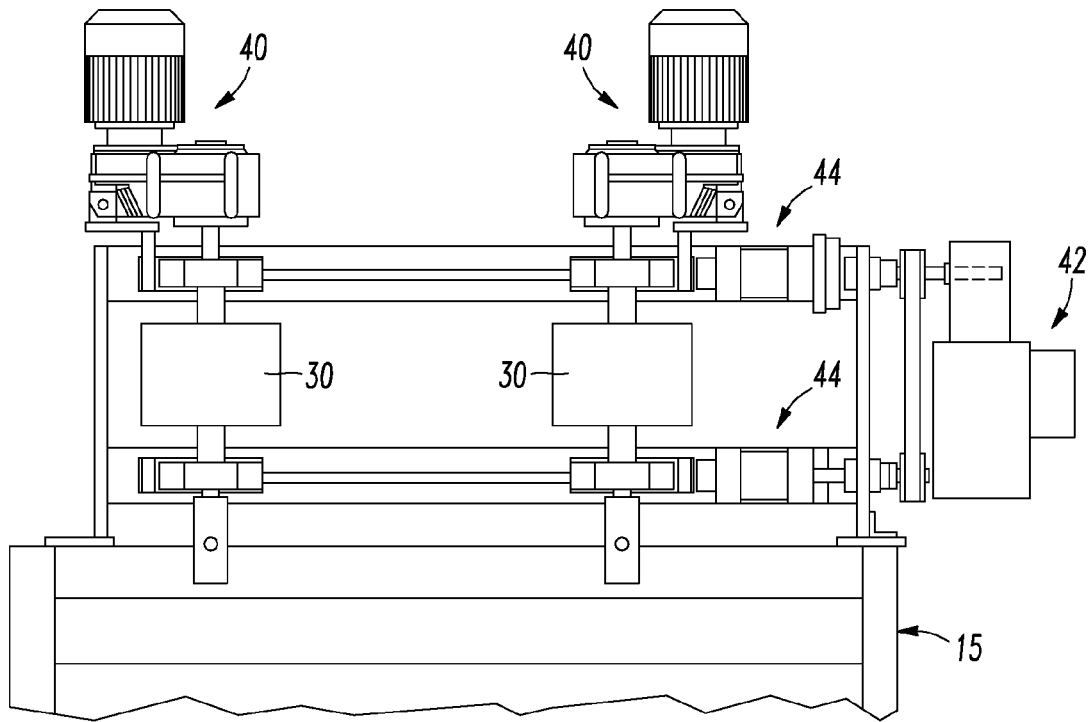
FIG. 3 is a cross-sectional view of the first present preferred embodiment of our machine taken along line III-III in FIG. 2.
Figure 4:
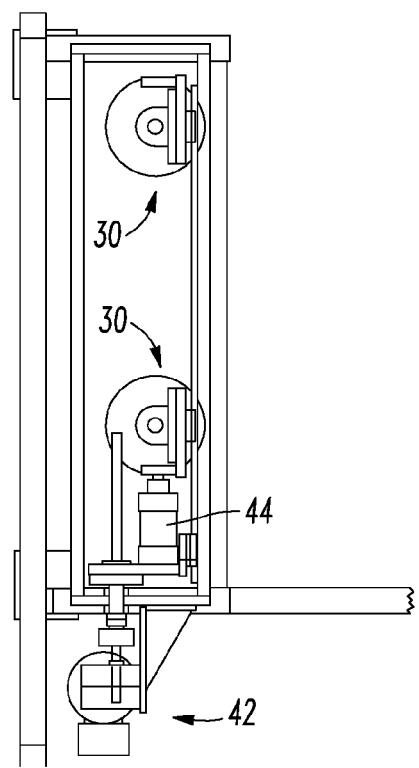
FIG. 4 is a fragmentary top view of a present preferred roller device.
Figure 5:
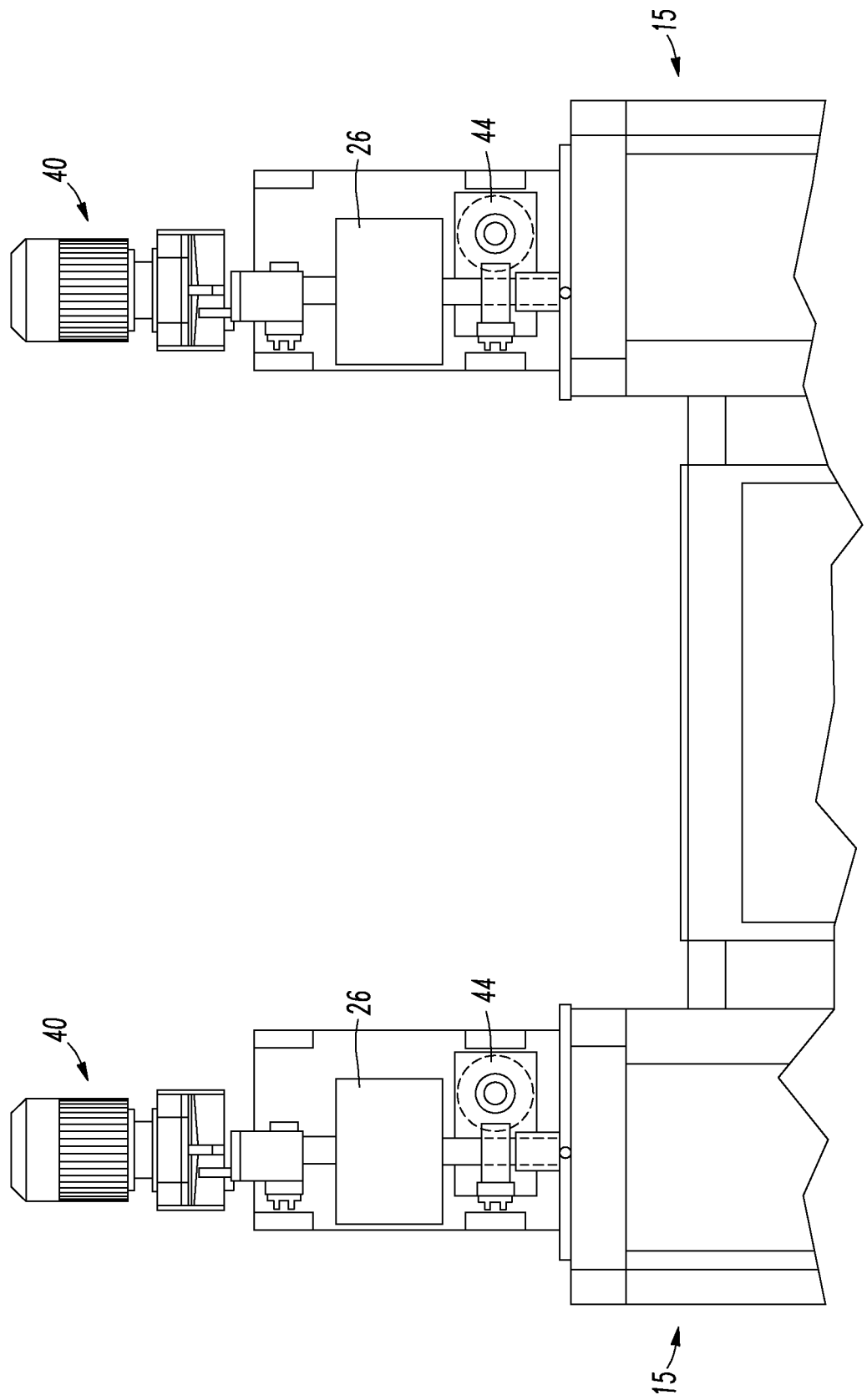
FIG. 5 is a cross-sectional view of the first present preferred embodiment of our machine taken along line V-V in FIG. 2.

There may be instances where the foam board shown in FIG. 1 has been milled or cut such that the top surface 5 or bottom surface 6 or both are not smooth. For such instances when the top surface 5 and/or the bottom surface 6 as well as the edges 3 are rough, a second set of roller pairs may be provided to seal the top surface and/or bottom surface as well as the edges. The second set of roller pairs may be similar to roller pairs 26 and 30 rotated ninety degrees and are shown in dotted line in FIG. 2. The first pair of rollers 51 is heated to a temperature of from 475° F. The second pair of rollers is heated to 120° F. to 160° F. Guide rollers 53 may be provided between these pairs of rollers. In FIG. 2, we show the second set of roller pairs 51, 52 positioned off the first set of roller pairs 26, 30. However, the second set of roller pairs may be integrated with the first set of roller pairs. Such integration would result in roller pair 51 being adjacent rollers 26 and roller pair 52 being adjacent rollers 30. In either configuration, the rollers should cause the foam board to travel at a speed of 90 ft/min to 120 ft/min.

We may provide a raised or lowered indicia 50 on either or both of the rollers in the second pair of rollers 30. This marking may be a logo or trademark that can be embossed on the sealed cut edges of a foam board or could be a lot number or other marking. When the board passes over the roller, the edge is marked with the indicia. Such an embossment is preferably sized and configured to be apparent from close distances but unobserved from far distances so that an observer of a structure that is built with such boards will not see the embossment unless standing very close to the boards.

A spacing mechanism 43 may be attached to one or both of the rollers of the second pair of rollers 30. This spacing mechanism 43 may operate similarly to the spacing mechanism 42 connected to the first pair of rollers 26.

The machine 21 also may include at least one controller 57. This controller may control the speed of the motors that turn the rollers 26, 30 as well as control the heating elements that heat the rollers.

Of course, other variations of the present preferred embodiments discussed above may be made. For example, embodiments of our machine can include a conveyor belt that helps move foam boards along the roller devices of the machine. As yet another example, embodiments of our machine may include rollers that are configured to only form a sealed edge on one side or edge of a foam board.

Our machine and method can be used for any foamed or cellular product that is thermoplastic in nature. This would include polyvinyl chloride and the olefins such as low density polyethylene, high density polyethylene and polypropylene. The boards may have been made by any process. However, at the time of our invention, the open foam process and Cekula process were the techniques being used by major manufacturers to make foam boards.

While we have shown and described certain present preferred embodiments of our apparatus for edge sealing foam boards and have illustrated certain present preferred methods edge sealing foam boards and making and using machines for edge sealing foam boards, it is to be distinctly understood that the invention is not limited thereto but may be otherwise variously embodied and practiced within the scope of the following claims.

We claim:

1. A machine for sealing cut edges of a foam board, the foam board having a top surface, a bottom surface, the cut edges comprising a first longitudinal cut edge extending between the top surface and the bottom surface and a second longitudinal cut edge extending between the top surface and the bottom surface, the machine comprising:
   a first pair of spaced apart rollers, such that a foam board having a known width may pass between the first pair of rollers and the rollers are spaced apart from one another a distance that is less than the width of the foam board, and each roller capable of rotating at a speed so that the foam board will pass between the first pair of rollers at a speed of at least 60 ft/min, the first pair of rollers heated to a temperature sufficient to soften the cut edges of the foam board; and
   a second pair of spaced apart rollers aligned with the first pair of spaced apart rollers, the rollers in the second pair of rollers being spaced apart a distance such that the rollers will engage the first and second cut edges of the foam board as the foam board passes between the second pair of rollers, the second pair of rollers each having a temperature that is lower than the temperature of the first pair of rollers.

2. The machine of claim 1 wherein the temperature of the rollers in the first pair of rollers is between 300° F. to 495° F.

3. The machine of claim 1 wherein rollers in the first pair of rollers rotate at a speed so that the foam board will pass between the first pair of rollers at a speed of between 60 ft/min and 120 ft/min.

4. The machine of claim 1 wherein the temperature of the rollers in the second pair of rollers is between 120° F. and 1606° F.

5. The machine of claim 1 also comprising a feeder aligned with the first pair of rollers and configured to feed the foam board to a position between the first pair of rollers.

6. The machine of claim 1 also comprising a milling device aligned with the first pair of rollers, the milling device positioned to engage and mill the cut edges so that the first and second cut edges are perpendicular to the top surface and perpendicular to the bottom surface of the foam board.

7. The machine of claim 1 also comprising a spacing mechanism attached to at least one of the rollers of the first pair of rollers, the spacing mechanism configured to change spacing between the rollers in the first pair of rollers.

8. The machine of claim 1 also comprising a spacing mechanism attached to at least one of the rollers of the second pair of rollers, the spacing mechanism configured to change spacing between the rollers in the second pair of rollers.

9. The machine of claim 1 also comprising at least one motor connected to at least one of the rollers in the first pair of rollers and one of the rollers in the second pair of rollers.

10. The machine of claim 9 further comprising at least one controller that is connected to the at least one motor.

11. The machine of claim 1 wherein the machine is further comprised of a moveable belt positioned adjacent the rollers of the first pair of rollers.

12. The machine of claim 1 wherein at least one roller in the second pair of rollers has an indicia positioned to imprint an edge of a foam board passing over the at least one roller.

13. A machine for sealing cut edges of a foam board, the foam board having a top surface, a bottom surface, the cut edges comprising a first longitudinal cut edge extending between the top surface and the bottom surface and a second longitudinal cut edge extending between the top surface and the bottom surface, the machine comprising:

a first pair of spaced apart rollers, such that a foam board having a known width may pass between the first pair of rollers and the rollers are spaced apart from one another a distance that is less than the width of the foam board, and each roller capable of rotating at a speed so that the foam board will pass between the first pair of rollers at a speed of at least 60 ft/min, the first pair of rollers heated to a temperature sufficient to soften the cut edges of the foam board;

a second pair of spaced apart rollers aligned with the first pair of spaced apart rollers, the rollers in the second pair of rollers being spaced apart a distance such that the rollers will engage the first and second cut edges of the foam board as the foam board passes between the second pair of rollers, the second pair of rollers each having a temperature that is lower than the temperature of the first pair of rollers;

a third pair of spaced apart rollers, at least one roller in the third pair of rollers having a temperature of 300° F. to 495° F.;

one roller in the third pair of rollers positioned to engage the top surface of the foam board and the second roller in the third pair of rollers positioned to engage the bottom surface of the foam board; and a fourth pair of spaced apart rollers aligned within the third pair of rollers and having a temperature that is lower than the temperature of the at least one roller in the third pair of rollers, one roller in the fourth pair of rollers positioned to engage the top surface of the foam board and the second roller in the fourth pair of rollers positioned to engage the bottom surface of the foam board.

* * * * *